United States Patent
Armstrong et al.

(10) Patent No.: US 7,351,272 B2
(45) Date of Patent: Apr. 1, 2008

(54) METHOD AND APPARATUS FOR CONTROLLING THE SIZE OF POWDER PRODUCED BY THE ARMSTRONG PROCESS

(75) Inventors: Donn Reynolds Armstrong, Lisle, IL (US); Richard Paul Anderson, Clarendon Hills, IL (US); Lance E. Jacobsen, Minooka, IL (US)

(73) Assignee: International Titanium Powder, LLC, Woodridge, IL (US)

(*) Notice: Subject to any disclaimer, the term of this patent is extended or adjusted under 35 U.S.C. 154(b) by 182 days.

(21) Appl. No.: 10/654,150

(22) Filed: Sep. 3, 2003

(65) Prior Publication Data

US 2004/0079196 A1  Apr. 29, 2004

Related U.S. Application Data

(60) Provisional application No. 60/411,328, filed on Sep. 17, 2002, provisional application No. 60/408,926, filed on Sep. 7, 2002, provisional application No. 60/408,683, filed on Sep. 7, 2002.

(51) Int. Cl.
  C22B 34/12  (2006.01)
  B22F 9/28   (2006.01)

(52) U.S. Cl. ............... 75/351; 75/367; 75/617; 75/620

(58) Field of Classification Search ........... 75/351, 75/363, 367, 369, 617, 619, 620
See application file for complete search history.

(56) References Cited

U.S. PATENT DOCUMENTS

| | | | | |
|---|---|---|---|---|
| 3,992,192 A | * | 11/1976 | Vartanian | 75/344 |
| 5,498,446 A | * | 3/1996 | Axelbaum et al. | 427/212 |
| 5,779,761 A | | 7/1998 | Armstrong et al. | |
| 5,958,106 A | * | 9/1999 | Armstrong et al. | 75/370 |
| 6,409,797 B2 | | 6/2002 | Armstrong et al. | |

* cited by examiner

Primary Examiner—George P. Wyszomierski
(74) Attorney, Agent, or Firm—Olson & Cepuritis, Ltd.; Harry M. Levy

(57) ABSTRACT

A method of controlling the size and morphology of powder made by the subsurface injection of a halide vapor into a liquid metal is disclosed. A reaction zone is established and the temperature thereof or the time the powder remains therein is controlled to change powder characteristics.

39 Claims, 1 Drawing Sheet

METHOD AND APPARATUS FOR CONTROLLING THE SIZE OF POWDER PRODUCED BY THE ARMSTRONG PROCESS

RELATED APPLICATIONS

This application, pursuant to 37 C.F.R. 1.78(c), claims priority based on provisional application U.S. Provisional Application Ser. No. 60/411,328 Filed Sep. 17, 2002, U.S. Provisional Application Ser. No. 60/408,926, Filed Sep. 7, 2002 and U.S. Provisional Application Ser. No. 60/408,683, Filed Sep. 7, 2002

BACKGROUND OF THE INVENTION

This invention relates to the Armstrong Process as described in U.S. Pat. Nos. 5,779,761, 5,958,106 and 6,409,797, the disclosures of each of which is incorporated herein by reference. When the above-captioned patents were filed, it was understood that the steady state reaction temperature could be varied depending upon the amount of excess liquid metal or the ratio of liquid metal to halide being reduced. For instance, the above-identified patents taught that using a greater excess of the liquid metal beyond the stoichiometric amount required for the reaction would produce a lower steady state reaction temperature and similarly, diluting or reducing the amount of halide introduced into the liquid metal would also reduce the steady state operating temperature of the process. However, there was no appreciation of the nature of what occurred at the reaction zone, as separate from down stream conditioning, and no appreciation that the particle size of the powder produced could be controlled by manipulating various parameters in the reaction zone.

Although the above referenced patents disclose that powder is produced having average size distributions in the range of from about 0.1 micron to about 10 microns, in fact what was produced was not controllable but was whatever happened to be produced according to the parameters of the reaction. Powder morphology has been discovered to be an important factor in the production of powder. Moreover, larger diameter powders have larger packing fractions and the control of the powder morphology has become an important aspect in the development of the Armstrong Process. It has been discovered that powder morphology is affected by a number of parameters including the temperature of the reaction zone, the length of time that the material stays in the reaction zone.

SUMMARY OF THE INVENTION

Accordingly, it is an object of the present invention to control powder morphology during the production of powder by the Armstrong Process.

Yet another object of the present invention is to control the temperature of reactants in the reaction zone.

Yet another object of the present invention is to provide a method of controlling the morphology of the powder produced with the Armstrong Process in which the temperature of the reaction products in the reaction zone and the time in which the products remain in the reaction zone are manipulated to control the size of the powder produced by the reaction.

Another object of the present invention is to control the temperature of the reaction products in the reaction zone by varying one or more of the pressure of the reaction zone, the constituents of the reaction zone and the time that the constituents remain in the reaction zone.

Still another object of the present invention is to control the temperature of the reactants in the reaction zone by means of controlling the reactants in the reaction zone by adding a reactive gas to the reaction zone.

Yet another object of the present invention is to provide an apparatus for controlling the morphology of the powder during the practice of the Armstrong invention in which the amount of excess liquid metal reductant is controlled during the reaction and subsequent thereto for quenching purposes.

A final object of the present invention is to provide an apparatus of the type set forth in which a gas injection nozzle is surrounded with a sleeve forming an annulus extending axially of a conduit providing liquid metal flow so as to control the amount of liquid metal present in the reaction zone and yet provide a substantial increase in the amount of liquid metal downstream of the reaction zone.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantage of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
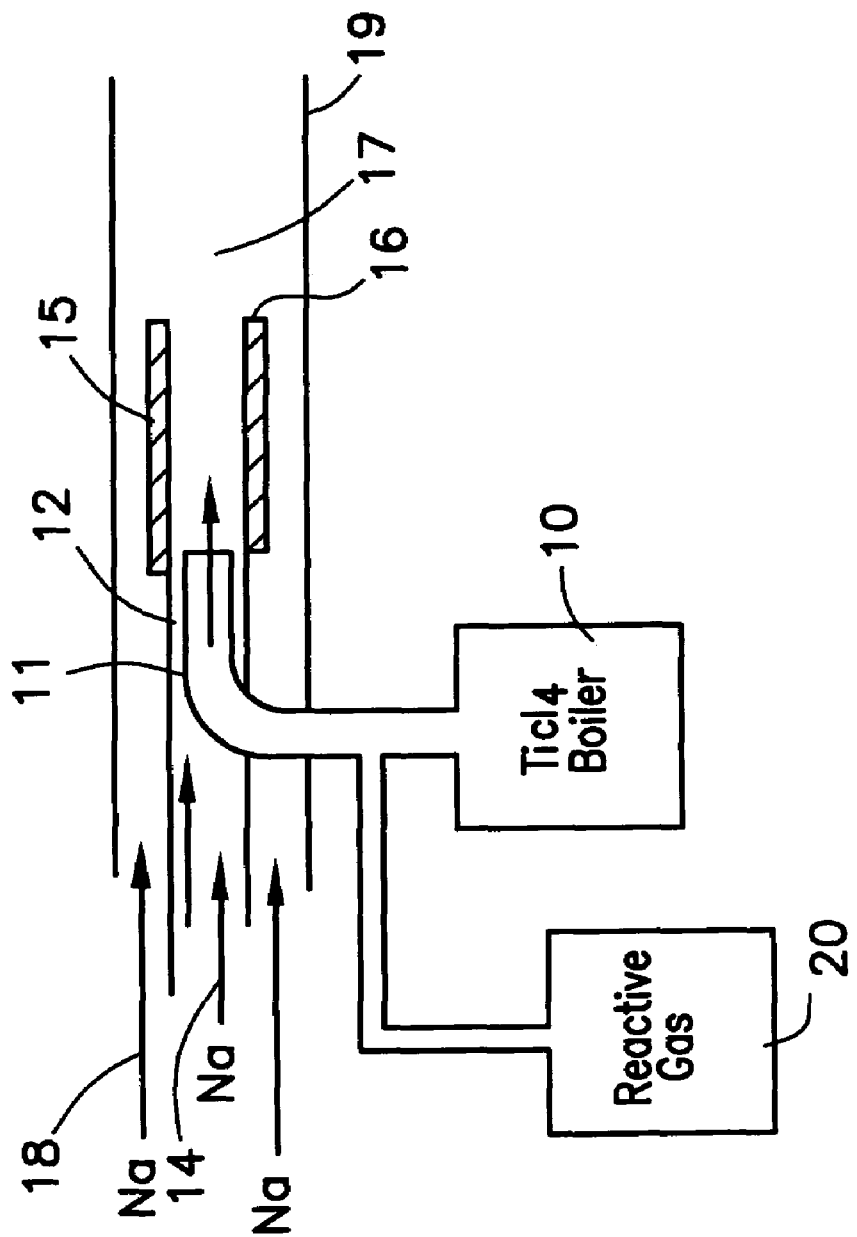
FIG. 1 is a schematic representation of an apparatus for practicing the invention.

By limiting the amount of excess sodium to which the reaction products are exposed the temperature of the reaction products can be maintained at a higher temperature for a longer period of time than possible if the reaction products are immediately exposed to large excess of sodium as soon as the reaction products are formed. By enclosing the reaction zone within a material such as a refractory and keeping the reaction products separated from large excess liquid metal which cools the reaction products by absorbing the heat of reaction, less cooling occurs and a longer high temperature reaction zone is obtained. By longer high temperature reaction zone, we mean a few inches where the temperatures of the reaction products are very high. Extending the high temperature zone prior to cooling the reaction products of salt and powder with additional liquid metal allows the powder particles to coalesce forming larger particles. There is a relationship between the time particles spend at elevated temperatures and the particle size. The reaction products could, if the excess sodium present was very small, reach very high temperatures at which steel or even titanium may fail. A ceramic environment can contain reaction products at high temperatures permitting larger particles to form. Any ceramic which is non-reactive with the reaction products at the reaction temperatures (for instance, such as a yttria tube or a metal tube with an interior surface of yttria, such as a tungsten tube internally coated with yttria) is applicable to the invention.

It is now believed that the reaction zone is a bubble containing vapor of the liquid reducing metal and liquid as well as vapor of the salt produced and the product powders. The upper limit of the temperature within the reaction zone is the boiling point of the salt produced by the reaction, for so long as liquid salt remains the phase change from liquid alt to vapor soaks up sufficient heat that the temperature will not exceed the salt boiling point. However, if all salt is in the vapor phase, then the temperature within the reaction zone can increase to the melting point of the produced powder.

We have determined that reaction zone temperature as well as the time at which reaction products are retained at reaction zone temperatures control to some degree, the morphology of the produced powder. There are a variety of conditions or combination of conditions which enable us to control reaction zone temperature and residence time of the produced powder in the reaction zone.

The temperature of the reaction zone can be controlled by increasing the pressure at which the reaction occurs or by adding a reactive gas, such as a halide, preferably chlorine, or by limiting the amount of reducing metal in the reaction zone. Duration in the reactor zone can be controlled by the length of the reaction zone, all as will be described, and various combinations may also be used.

Referring to FIG. 1, as an example only, $TiCl_4$ from a boiler 10 flows as a vapor through a nozzle 11 into a stream 14 of sodium contained in a tubular reactor 12. By virtue of the flow rates of the $TiCl_4$ and sodium the amount of excess sodium over stoichiometric is kept small so that the temperature of the reaction products is high. A ceramic tube 15 or metal tube having an internal surface of ceramic or other high temperature material contains the high temperature reaction products and extends the time at which the reaction products remain at high temperature before the reaction products exit the tube 15 at the end 16 thereof to encounter a large excess of liquid sodium in a quench zone 17 formed by sodium 18 contained in a larger tube or reactor 19.

Although illustrated with $TiCl_4$ and sodium, the invention applies to any material made by the exothermic reduction of a halide gas with a reductant metal as taught in the patents referenced above. To add a reactive gas, a source 20 is in fluid communication with the chloride vapor being reduced.

In the process taught in the above-referenced patents, the temperature in the reaction zone is limited by the phase changes of the material in the reaction zone produced such as the salt or the reductant metal or the produced elemental material or alloy. In the examples disclosed in the referenced patents, the reaction product stream contains a slurry of excess liquid sodium and solid sodium chloride and solid titanium powder. While the boiling point of the sodium chloride is higher than the boiling point of the sodium and lower than the melting point of titanium, in the reaction zone, as stated, in sodium vapor. NaCl liquid and vapor and titanium solid. Therefore, in order to increase the temperature of the reaction zone above the boiling point of sodium chloride (1662° C.) to the melting point of titanium at 1668° C., the boiling point of the sodium chloride needs to be raised so that it equals or exceeds the melting point of the titanium. If the boiling point of the reductant metal (such as sodium) and the produced salt (such as NaCl) is raised above the melting point of the produced elemental material (such as Ti) or alloy, the element material (such as Ti) or alloy or ceramic particles produced can melt and coalesce, thereby forming larger particles with smaller surface areas and higher packing fractions. If the control of the reaction zone temperature is accomplished by operating the reaction zone under pressure so that the boiling point of the produced salt (NaCl) exceeds the melting point of the produced elemental material or alloy (titanium), the pressure required to increase the boiling point of NaCl above the melting point of Ti is not large. Pressures in the range of from about 14 psig to about 150 psig are useful to make powder having diameters in the 0.1 to about 20 µ micron range. Moreover, particularly, 2-3 atmospheres effectively raise the boiling point of NaCl to requisite temperatures.

Therefore, the process of the present invention controls the size, surface area and packing fraction of particles produced by the method disclosed in the above identified patents by increasing the pressure in the reaction zone to control the temperature of the materials in the reaction zone so that the melting point of the produced metal is lower than the boiling point of the produced salt.

In the process disclosed in the referenced patents, the limit of the temperature in the reaction zone is the boiling point of the highest boiling material in the reaction zone which exists in two phases. For instance, in the process specifically described by way of example only in the referenced patent, $TiCl_4$ reduced by liquid Na produces NaCl and Ti solids in the presence of excess liquid Na. So long as liquid sodium is present, the reaction temperature will not exceed the boiling point of Na or 892° C. After all the liquid Na has been vaporized, the NaCl, now molten, will begin to boil and its boiling point of 1465° C. at one atm will limit the reaction zone temperature. Because the boiling point of NaCl 1465° C. at one atm is lower than the melting point of Ti (1662° C.), the temperature in the reaction zone will remain below the Ti melting point, as long as liquid NaCl is present. Raising the pressure in the range of from about 2 to about 3 atmospheres, increases the boiling point of the NaCl, permitting the temperature in the reaction zone to increase.

By adding a reactant gas such as chlorine to the reaction chamber in which titanium tetrachloride is reduced by sodium, such as by combining chloride gas with the $TiCl_4$, the temperature of the reaction products can be raised beyond the boiling point of sodium chloride so that the titanium particles produced will melt, coalesce and become larger. The reactant gas must contribute more energy to the reaction than it absorbs or the invention will not have its intended result. Moreover, the reactant gas should be selected to avoid adding unwanted impurities to the produced elemental material or alloy thereof. Additions of chlorine in the range of from about 90 mole percent to about 200 mole percent of the halide being reduced will provide increased temperature in the reaction zone.

While there has been disclosed what is considered to be the preferred embodiment of the present invention, it is understood that various changes in the details may be made without departing from the spirit, or sacrificing any of the advantages of the present invention.

What is claimed is:

1. A method of controlling the size of powder produced from the reduction of a halide vapor by a liquid alkali metal or a liquid alkaline earth metal or mixtures thereof to produce a slurry of a powder and salt in excess liquid alkali or alkaline earth metal or mixtures thereof, comprising establishing a reaction zone by introducing a halide vapor into a first stream of liquid alkali and/or alkaline earth metal causing an exothermic reaction, the reaction zone including vapor of an alkali metal or an alkaline earth metal or mixtures thereof and vapor of the salt produced by the exothermic reaction, controlling one or both of the temperature of the reaction products in the reaction zone and the time during which the reaction products are maintained in the reaction zone to vary the size of the powder and thereafter introducing the reaction products into a second stream of liquid alkali and/or alkaline earth metal, whereby increasing the temperature of the reactants in the reaction zone and/or the length of time of the reactants in the reaction zone increases the size of the powder within the range of from about 0.1 micron to about 20 microns.

2. The method of claim 1, wherein the powder is a ceramic.

3. The method of claim 2, wherein the ceramic is a nitride or a carbide.

4. The method of claim 2, wherein the liquid metal is Na or Mg and the halide is a chloride.

5. The method of claim 4, wherein the temperature of the reactants in the reaction zone is controlled by controlling the volume percent of the reductant metal vapor in the reaction zone.

6. The method of claim 5, wherein the reaction zone is operated at a pressure in the range of from about 14 psig to about 150 psig.

7. The method of claim 6, wherein the temperature of the reactants in the reaction zone is controlled by the boiling point of the salt vapor in the reaction zone.

8. The method of claim 7 wherein the reaction zone is operated above atmospheric pressure.

9. The method of claim 1, wherein the powder includes one or more of Ti, Al, Sb, Be, B, Ta, Zr, V, Nb, Mo, Ga, U, Re or Si.

10. The method of claim 1, wherein the percentage of alkali metal or alkaline earth metal vapor in the reaction zone is controlled to vary the temperature of the Contents of the reaction zone.

11. The method of claim 1, comprising introducing a reactive gas or mixture thereof into the reaction zone to increase the temperature thereof.

12. The method of claim 11, wherein the reactive gas is chlorine.

13. The method of claim 12, wherein the chlorine is present in the range of from about 90 mole percent to about 200 mole percent of the halide being reduced.

14. The method of claim 1, wherein the boiling point of the salt in the reactive zone is controlled to be equal to or greater than the melting point of the powder in the reaction zone.

15. The method of claim 1, wherein the reaction zone is confined by a ceramic surface and upon exit from the ceramic surface the reactants are introduced into the second stream of alkali and/or alkaline earth liquid metal to cool the reactants.

16. The method of claim 1, wherein the reaction zone is a bubble.

17. A method of controlling the size of powder produced from the reduction of a halide vapor by a liquid alkali metal or a liquid alkaline earth metal or mixtures thereof to produce a slurry of a powder and salt in excess liquid alkali or alkaline earth metal or mixtures thereof, comprising establishing a reaction zone by introducing a halide vapor into a first stream of liquid alkali and/or alkaline earth metal causing an exothermic reaction, the reaction zone including vapor of an alkali metal or an alkaline earth metal or mixtures thereof and vapor of the salt produced by the exothermic reaction, controlling one or both of the temperature of the reaction products in the reaction zone and the time during which the reaction products are maintained in the reaction zone to vary the size of the powder and thereafter introducing the reaction products into a second stream of liquid alkali and/or alkaline earth metal, whereby increasing the temperature of the reactants in the reaction zone and/or the length of time of the reactants in the reaction zone increases the size of the powder within the range of from about 0.1 micron to about 20 microns, a reactive gas in addition to the halide being reduced is present in the reaction zone to increase the temperature of the contents thereof.

18. A method of controlling the size of powder produced from the reduction of a halide vapor by a liquid alkali metal or a liquid alkaline earth metal or mixtures thereof to produce a slurry of a powder and salt in excess liquid alkali or alkaline earth metal or mixtures thereof, comprising establishing a reaction zone by introducing a halide vapor into a first stream of liquid alkali and/or alkaline earth metal causing an exothermic reaction, the reaction zone including vapor of an alkali metal or an alkaline earth metal or mixtures thereof and vapor of the salt produced by the exothermic reaction, controlling one or both of the temperature of the reaction products in the reaction zone and the time during which the reaction products are maintained in the reaction zone to vary the size of the powder and thereafter introducing the reaction products into a second stream of liquid alkali and/or alkaline earth metal, whereby increasing the temperature of the reactants in the reaction zone and/or the length of time of the reactants in the reaction zone increases the size of the powder within the range of from about 0.1 micron to about 20 microns, the boiling point of the salt in the reaction zone is controlled to determine the maximum temperature of the contents in the reaction zone and to vary the size of the metal powder.

19. The method of claim 18, wherein the reaction zone is operated above atmospheric pressure.

20. The method of claim 18, wherein the reaction zone is operated in the range of from about 14 psig to about 150 psig.

21. The method of claim 18, wherein the percentage of alkali metal or alkaline earth metal vapor in the reaction zone is controlled to vary the temperature of the contents of the reaction zone.

22. The method of claim 18, wherein a reactive gas in addition to the halide being reduced is present in the reaction zone to increase the temperature of the contents thereof.

23. The method of 22 claim, wherein the reactive gas is a halide or mixture thereof.

24. The method of claim 23, wherein the reactive as is chlorine.

25. The method of claim 24, wherein the chlorine is present in the range of from about 90 mole percent to about 200 mole percent of the halide being reduced.

26. The method of claim 18, wherein the boiling point of the salt in the reactive zone is controlled to be equal to or greater than the melting point of the metal powder in the reaction zone.

27. The method of claim 18, wherein the reaction zone is confined by a ceramic surface and upon exit from the ceramic surface the reactants are introduced into excess alkali and/or alkaline earth liquid metal to cool the reactants.

28. The method of claim 27, wherein the ceramic surface is yttria.

29. The method of claim 28, wherein the ceramic surface is a tube.

30. The method of claim 18, wherein the powder includes one or more of Ti, Al, Sb, Be, B, Ta, Zr, V, Nb, Mo, Ga, U, Re or Si.

31. A method of controlling the size of metal powder produced from the reduction of a halide vapor by a liquid alkali metal or a liquid alkaline earth metal or mixtures thereof to produce a slurry of a metal powder and salt in excess liquid alkali and/or alkaline earth metal or mixtures thereof, comprising establishing a reaction zone by introducing a halide vapor into a liquid alkali or alkaline earth metal, introducing reactive halide gas in addition to the halide being reduced into the reaction zone causing an exothermic reaction to increase the temperature in the reaction zone, the reaction zone including vapor of an alkali metal or an alkaline earth metal or mixtures thereof and vapor of the salt produced by the exothermic reaction, controlling the boiling point of the salt in the reaction zone and optionally the time during which the reaction products are maintained in the reaction zone and optionally the volume percent of vapor of the alkali metal or the alkaline earth metal to vary the size of the metal powder, whereby increasing the temperature of the reactants in the reaction zone and/or the length of time of the reactants in the reaction zone and/or decreasing the volume percent of the metal vapor in the reaction zone increases the size of the metal powder within the range of from about 0.1 micron to about 20 microns.

32. The method of claim 31, wherein the reaction zone is operated above atmospheric pressure.

33. The method of claim 32, wherein the reaction zone is operated in the range of from about 14 psig to about 150 psig.

34. The method of claim 33, wherein the reactive gas is a halide or mixture thereof.

35. The method of claim 34, wherein the reactive gas is chlorine.

36. The method of claim 32, wherein the chlorine is present in the range of from about 90 mole percent to about 200 mole percent of the halide being reduced.

37. The method of claim 32, wherein the boiling point of the salt in the reactive zone is controlled to be equal to or greater than the melting point of the metal powder in the reaction zone.

38. The method of claim 32, and further providing a ceramic surface confining the reaction zone and upon exit from the ceramic surface the reactants are introduced into excess alkali and/or alkaline earth liquid metal to cool the reactants.

39. The method of claim 31, wherein the powder includes one or more of Ti, Al, Sb, Be, B, Ta, V, Nb, No, Ga, U, Re or Si.

* * * * *